US010462249B2

United States Patent
(12) United States Patent
Bavandpouri

(10) Patent No.: US 10,462,249 B2
(45) Date of Patent: Oct. 29, 2019

(54) GLOBALLY DISTRIBUTED VIRTUAL CACHE FOR WORLDWIDE REAL-TIME DATA ACCESS

(71) Applicant: SUPER MICRO COMPUTER, INC., San Jose, CA (US)

(72) Inventor: Farid Bavandpouri, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 282 days.

(21) Appl. No.: 14/586,495

(22) Filed: Dec. 30, 2014

(65) Prior Publication Data

US 2016/0057245 A1 Feb. 25, 2016

Related U.S. Application Data

(60) Provisional application No. 62/041,570, filed on Aug. 25, 2014.

(51) Int. Cl.
*G06F 15/16* (2006.01)
*H04L 29/08* (2006.01)
(Continued)

(52) U.S. Cl.
CPC ......... *H04L 67/2842* (2013.01); *H04B 7/185* (2013.01); *H04B 7/18515* (2013.01);
(Continued)

(58) Field of Classification Search
CPC ......... H04L 29/08729; H04L 29/08801; H04L 67/2842; H04L 67/288; H04L 67/18;
(Continued)

(56) References Cited

U.S. PATENT DOCUMENTS 6,112,279 A * 8/2000 Wang .................. G06F 12/0813 707/E17.12
7,403,946 B1 * 7/2008 Taylor ............... G06F 17/30861 707/612
(Continued)

OTHER PUBLICATIONS

Farid Bavandpouri, "Convergence to Green Computing", Sep. 23, 2009, available at http://wikibon.org/wiki/v/Convergence_to_Green_Computing, pp. 1-5.
(Continued)

*Primary Examiner* — Liang Che A Wang
*Assistant Examiner* — Johnny B Aguiar
(74) *Attorney, Agent, or Firm* — Artegis Law Group, LLP

(57) ABSTRACT

A globally distributed virtual cache is configured to provide storage resources for users around the globe. A user of the virtual cache uses a computing device to access data that is stored in storage centers included within the virtual cache. Those storage centers may be surface-based, atmosphere-based, or space-based. When the user accesses the same data repeatedly, the virtual cache migrates that data to a storage center that is closer to the user, thereby reducing latencies associated with accessing that data. When the user attempts to communicate with another user also coupled to the virtual cache, the virtual cache buffers data that is exchanged between those users to facilitate real-time or near real-time communication between those users.

22 Claims, 7 Drawing Sheets

(51) Int. Cl.
*H04B 7/185* (2006.01)
*G06F 3/06* (2006.01)

(52) U.S. Cl.
CPC .............. *H04L 67/18* (2013.01); *G06F 3/067* (2013.01); *H04L 29/08729* (2013.01); *H04L 29/08801* (2013.01); *H04L 67/1097* (2013.01); *H04L 67/288* (2013.01)

(58) Field of Classification Search
CPC ........... H04L 67/1097; G06F 17/30902; G06F 3/067; G06F 17/30575
USPC ......................... 709/213, 214, 217, 219, 223
See application file for complete search history.

(56) References Cited

U.S. PATENT DOCUMENTS 8,612,284 B1* 12/2013 Sharif ..................... G06F 3/067 705/400
9,390,052 B1* 7/2016 Parakh .................. G06F 15/167
9,454,326 B1* 9/2016 Bono ...................... G06F 3/065
2002/0022452 A1* 2/2002 Toya .................... H04B 7/1853 455/13.1
2005/0108374 A1* 5/2005 Pierzga .............. H04B 7/18504 709/223
2007/0050761 A1* 3/2007 Hester ..................... H04L 63/08 717/168
2008/0235292 A1* 9/2008 Janin ................. G06F 17/30575
2008/0270686 A1* 10/2008 Grannan ................ G06Q 30/02 711/113
2009/0070337 A1* 3/2009 Romem ............ G06F 17/30457
2009/0119734 A1* 5/2009 Deshpande ........ H04N 7/17318 725/118
2009/0132543 A1* 5/2009 Chatley ................. G06F 3/0613
2010/0076933 A1* 3/2010 Hamilton .............. G06F 3/0604 707/640
2010/0241810 A1* 9/2010 Lowery ............... G06F 17/3087 711/130
2010/0312861 A1* 12/2010 Kolhi ...................... H04L 67/28 709/219
2011/0196828 A1* 8/2011 Drobychev ....... G06F 17/30581 707/622
2011/0246518 A1* 10/2011 Mehrotra ............ H04L 67/2842 707/770
2012/0173486 A1* 7/2012 Park .................... H04L 67/1095 707/634
2013/0145099 A1* 6/2013 Liu ..................... H04L 67/2842 711/133
2013/0339295 A1* 12/2013 Dean ..................... G06F 3/0611 707/610
2013/0339470 A1* 12/2013 Jeswani .............. H04L 67/1097 709/213
2014/0173232 A1* 6/2014 Reohr ................... G06F 3/0611 711/162
2014/0335895 A1* 11/2014 Teller ...................... H04W 4/04 455/456.1
2015/0242150 A1* 8/2015 Sorenson, III ........ G06F 3/0611 711/114

OTHER PUBLICATIONS

Alex Leites, "Network storage—Past, Present, and Future", May 19, 2010, available at http://www.icc-usa.com/insights/network-storage-past-present-and-future/, pp. 1-4.

* cited by examiner

GLOBALLY DISTRIBUTED VIRTUAL CACHE FOR WORLDWIDE REAL-TIME DATA ACCESS

CROSS-REFERENCE TO RELATED APPLICATIONS

This application claims the benefit of U.S. provisional patent application titled, "Globally Distributed Virtual Cache for Worldwide Real-Time Data Access," filed on Aug. 25, 2014 and having Ser. No. 62/041,570. The subject matter of this related application is hereby incorporated herein by reference.

BACKGROUND OF THE INVENTION

Field of the Invention

The present invention relates generally to caching systems and, more specifically, to a globally distributed virtual cache for worldwide real-time data access.

Description of the Related Art

As the Internet continues to grow, regions of the Earth separated by vast distances are slowly becoming connected to one another. In the early days of this expansion, telephone lines spanned the oceans and allowed people within cities on different continents to talk with one another. More recently, advanced telecommunications infrastructure has been built that allows more diverse forms of communication to occur. For example, fiber optic cables now span many portions of Earth, allowing the transfer of generic types of data to occur, including voice data, image and video data, computer files, and so forth.

Despite the advances described above, the Internet as a whole suffers from general connectivity issues that interfere with global communication. More specifically, at least three limitations decrease the abilities of users to communicate with one another. First, despite the increasing reach of the Internet, much of the Earth lacks communication infrastructure. For example, unpopulated or "off the grid" regions such as the Sahara or the South Pole are not connected to the Internet, and so visitors to these regions, or pioneers intending to colonize such regions, are faced with limited ability to communicate with the outside world. In many cases wiring these regions is infeasible; in the two exemplary regions mentioned above, the extreme climates associated with those regions generally makes building physical infrastructure impossible.

Second, even when communication infrastructure is present in a given region, a user is required to be within range of an access point in order to access the Internet. An access point could be, for example, a WiFi™ router, a cellular tower, or another type of wireless connection. Alternatively, an access point could be a T1 connection, a digital subscriber line (DSL) connection, or another type of wired connection. In either case, the user must be within proximity to physical hardware capable of communicating with other Internet connected devices. In many countries with established Internet infrastructure, sparsely populated regions exist that remain devoid of access points or have a limited number of access points. Generally, this situation occurs because there is little incentive to provide Internet access to regions that lack a potentially large customer base.

Third, users attempting to communicate with one another across vast distances that are, in fact connected via Internet infrastructure oftentimes experience faulty and/or error-prone communications. Such issues arise because many portions of the Internet depend on unreliable infrastructure. In some cases these issues make certain types of communication difficult or impossible. For example, suppose a person in the North Dakota wished to video chat with another person in Madagascar, thereby requiring video signals to be exchanged between those two relatively remote locations. The pathway between the two people could involve any number of wireless and wired pathways, including cell networks, WiFi™ networks, transatlantic cables, telephone lines, and so forth. Each of these different communication mediums could potentially introduce a different type of distortion and any duration of delay into the video signal. As result, the video displayed to either user might end up choppy, distorted, out of sync with accompanying audio, and/or generally unwatchable.

In sum, the Internet has only limited connectivity. Building Internet infrastructure is some regions is simply infeasible. Other regions lack Internet infrastructure simply because building such infrastructure is not cost effective. Finally, Internet connections between relatively remote regions on Earth are oftentimes of such poor quality that communication is difficult or impossible.

As the foregoing illustrates, what is needed in the art is a more effective approach to improving connectivity over the Internet.

SUMMARY OF THE INVENTION

One embodiment of the present invention sets forth a computer-implemented method for caching data within a globally distributed virtual cache, including provisioning a first portion of the globally distributed virtual cache to include a first storage resource that is associated with a first geographic region and is configured to cache data associated with a first computing device, determining that the first computing device has accessed data that is stored in a second geographic region, and reconfiguring the first portion of the globally distributed virtual cache to include a second storage resource associated with a second region.

At least one advantage of the present invention is that users of the virtual cache may access data from one another in real-time or near real-time, without the disruptive effects of stalled data streams, decreased frame rates, low resolution video, and so forth.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Among other things, embodiments of the present invention are directed towards a globally distributed virtual cache that allows real-time or near real-time data access from worldwide locations. In the context of this disclosure, a "virtual cache" refers to distributed data storage and corresponding logic to support data input/output (I/O) operations associated with that storage. This distributed storage generally assumes the form of multiple different storage centers located on, above, and around the Earth. Each storage center includes a collection of server machines configured to cache data to support the operation of the virtual cache mentioned above.

The overall architecture of the virtual cache, including the various types of storage centers described above, enables users of the virtual cache to access remotely stored data in real-time (or near real-time) from potentially anywhere on Earth. Accordingly, the virtual cache disclosed herein increases the connectivity of the Internet, thereby improving worldwide communications.

System Overview

Figure 1:
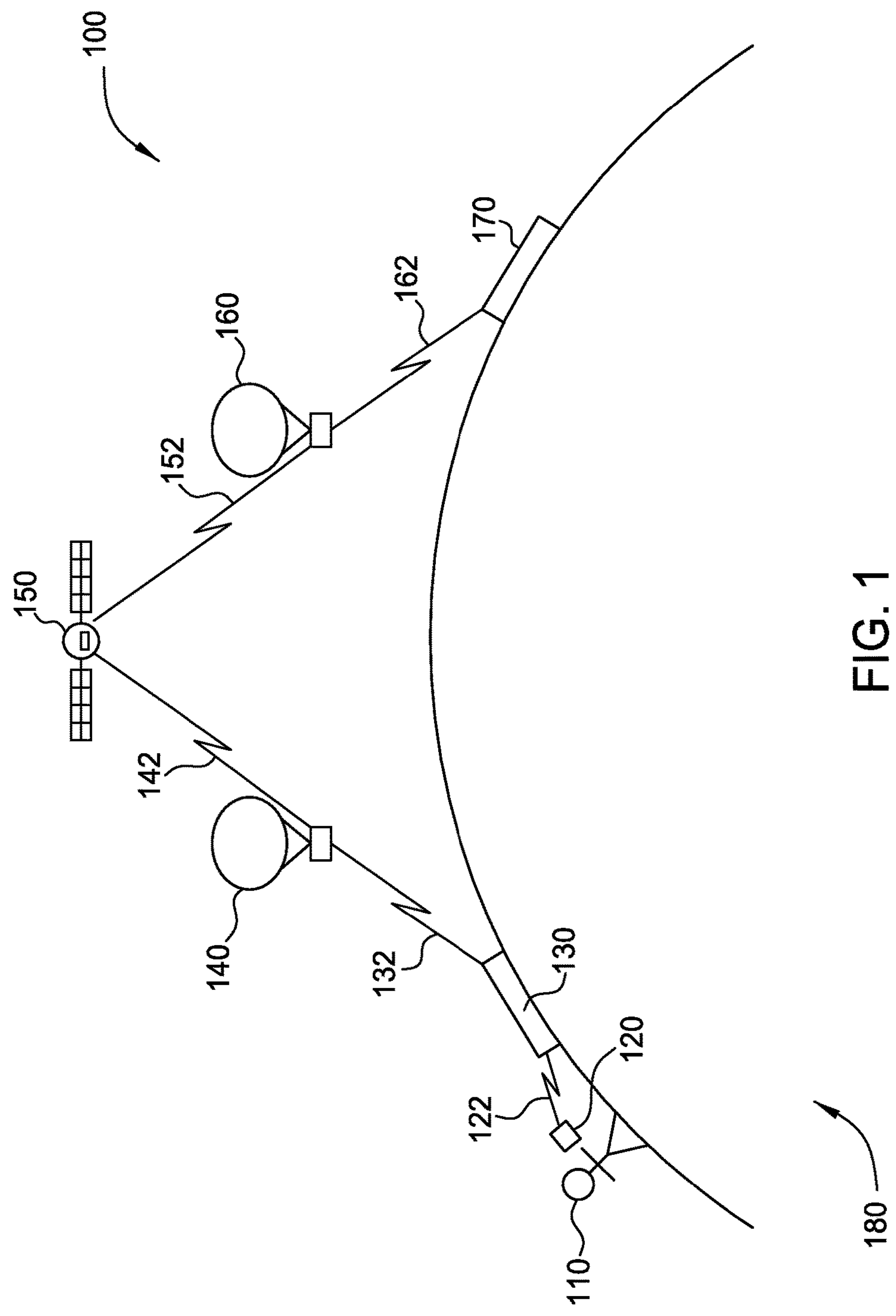
FIG. 1 illustrates a virtual cache configured to provide globally accessible and elastic data storage for a user, according to one embodiment of the present invention.

FIG. 1 illustrates a virtual cache 100 configured to provide globally accessible and elastic data storage for a user 110, according to one embodiment of the present invention. As shown, virtual cache 100 includes storage centers 130, 140, 150, 160, and 170. Storage center 130 is coupled to storage center 140 by data connection 132, storage center 140 is coupled to storage center 150 by data connection 142, storage center 150 is coupled to storage center 160 by data connection 152, and storage center 160 is coupled to storage center 170 by data connection 162.

Storage centers within virtual cache 100 may be surface-based, atmosphere-based, or space-based. In FIG. 1, storage centers 130 and 170 are surface-based storage centers. Each of storage centers 130 and 170 could be, for example, a datacenter, a server farm, a storage and processing cloud, an ocean platform or floating barge, and so forth. Storage centers 140 and 160 are atmosphere-based storage centers. Each of storage centers 140 and 160 could be, for example, a hot air balloon, a helium balloon, any other type of airship, a solar-powered autonomous glider, a high-altitude tethered kite, or any other type of flying device capable of lifting a collection of server machines into the atmosphere. Storage center 150 is a space-based storage center that could be, for example, a satellite, microsatellite, space station, spaceship, and so forth.

Any of storage centers 130, 140, 150, 160, and 170 may be configured to communicate with any other storage center within virtual cache 100 via physical connections such as wires or cables, wireless connections such as radio frequency (RF) or optical connections, or any combination thereof. Any storage center may also communicate with any other storage center via one or more intermediate storage centers.

For example, storage center 130 could communicate wirelessly with storage center 140 via data connection 132. In turn, storage center 140 could communicate with storage center 150, on behalf of storage center 130, via data connection 142. Storage center 140 thus acts as an intermediary between storage center 130 and storage center 150. Continuing this example, storage center 150 could further communicate with storage center 160 via data connection 152, and storage center 160 could then communicate with storage center 170, on behalf of storage center 150, via data connection 162. In this fashion, storage centers 140, 150, and 160 operate in conjunction with one another as intermediaries between storage centers 130 and 170.

Figure 5:
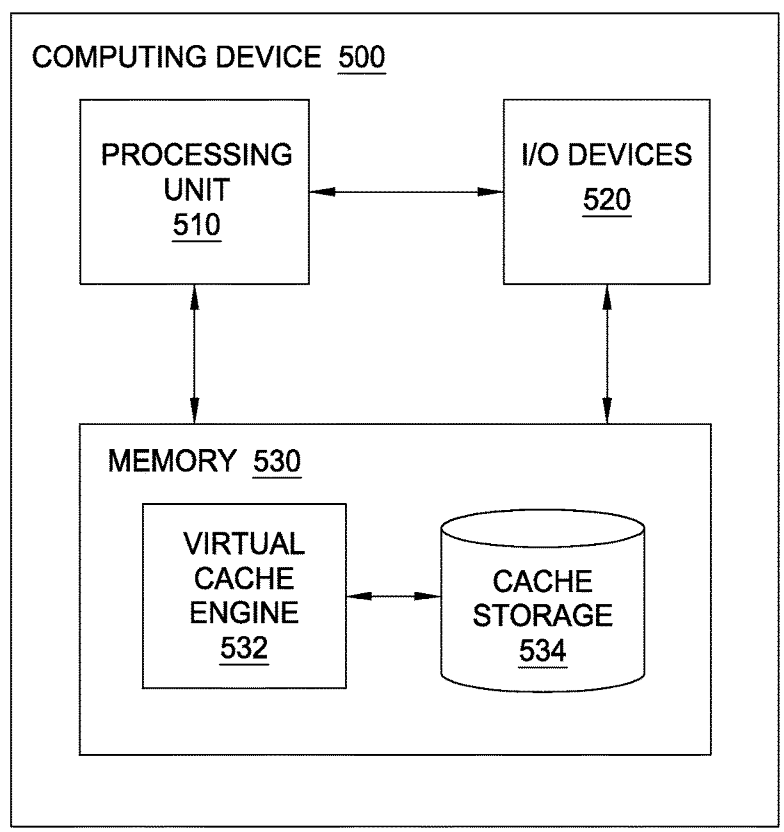
FIG. 5 illustrates a computing device configured implement one or more aspects of the present invention.

Each of storage centers 130, 140, 150, 160 and 170 generally includes one or more server machines configured to perform data processing, storage, and I/O operations. An exemplary computing device configured to operate as a server machine within a storage center of virtual cache 100 is shown in FIG. 5. Each server machine within a given storage center may perform cache-related operations on behalf of the storage center, including cache reads, cache writes, cache evictions, and so forth. A given server machine may be configured to implement any technically cache policy in order to manage cached data.

Each server machine within a given storage center, and each of storage centers 120, 130, 140, 150, and 160 within virtual cache 100, are coupled together and coupled to the Internet. In general, virtual cache 100 as a whole is configured to form a portion of the infrastructure of the Internet. User 110 may thus access the Internet via a computing device 120 when computing device is coupled to storage center 130. In addition, user 110 may access any data that is cached within virtual cache 100 via computing device 120. Virtual cache 100 is configured to automatically provision storage space for data associated with computing device 120 in order to (i) cache data that is used repeatedly by computing device 120 and (ii) buffer data that is streamed from a remote location to computing device 120. These two use cases are discussed in greater detail below.

When caching data for repeated access, virtual cache 100 is configured to monitor data that is accessed by user 110 and to migrate that data from an original remote storage location to one or more storage centers proximate to user 110 when repeat access of that data occurs. For example, user 110 may repeatedly access data that is stored in storage center 150. In order to decrease latency associated with the repeated access of this data, virtual cache 100 could migrate that data to storage center 130, which, as is shown, resides proximate to user 110. Generally, virtual cache 100 may migrate data to some or all of the storage centers that reside between the location of user 110 and the remote location where the data originates.

When buffering data that is streamed to computing device 120 from a remote location, virtual cache 100 may provision cache space within storage centers that reside between computing device 120 and the remote location. For example, user 110 could stream data from storage center 150, and virtual cache 100 would then provision storage space in storage centers 140 and 130 for buffering that data. In this fashion, virtual cache 100 may hide latencies and other transmission artifacts typically associated with the transmission of data.

Figure 2:
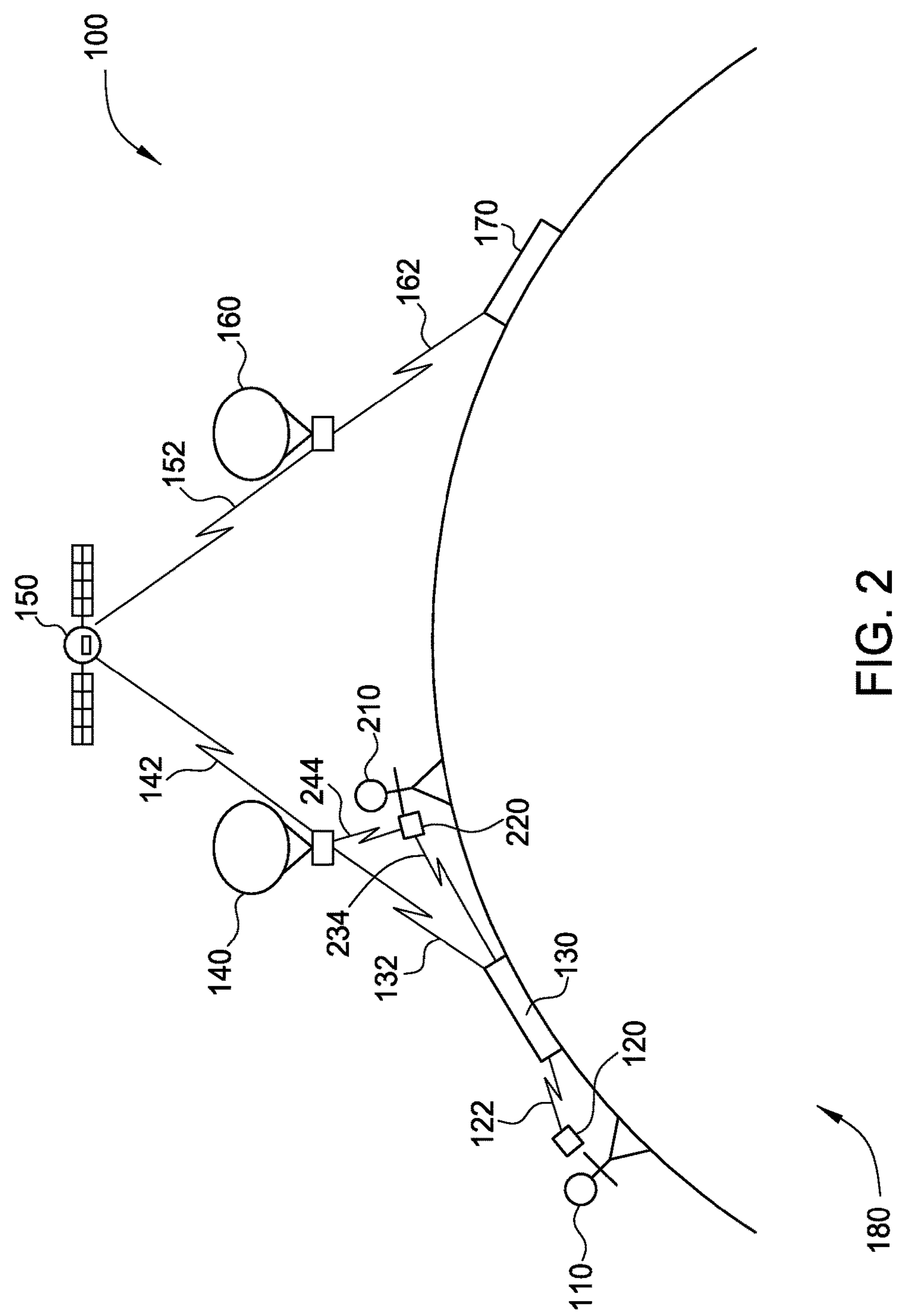
FIGS. 2-4 illustrate an exemplary expansion of the virtual cache of FIG. 1, according to one embodiment of the present invention.
Figure 3:
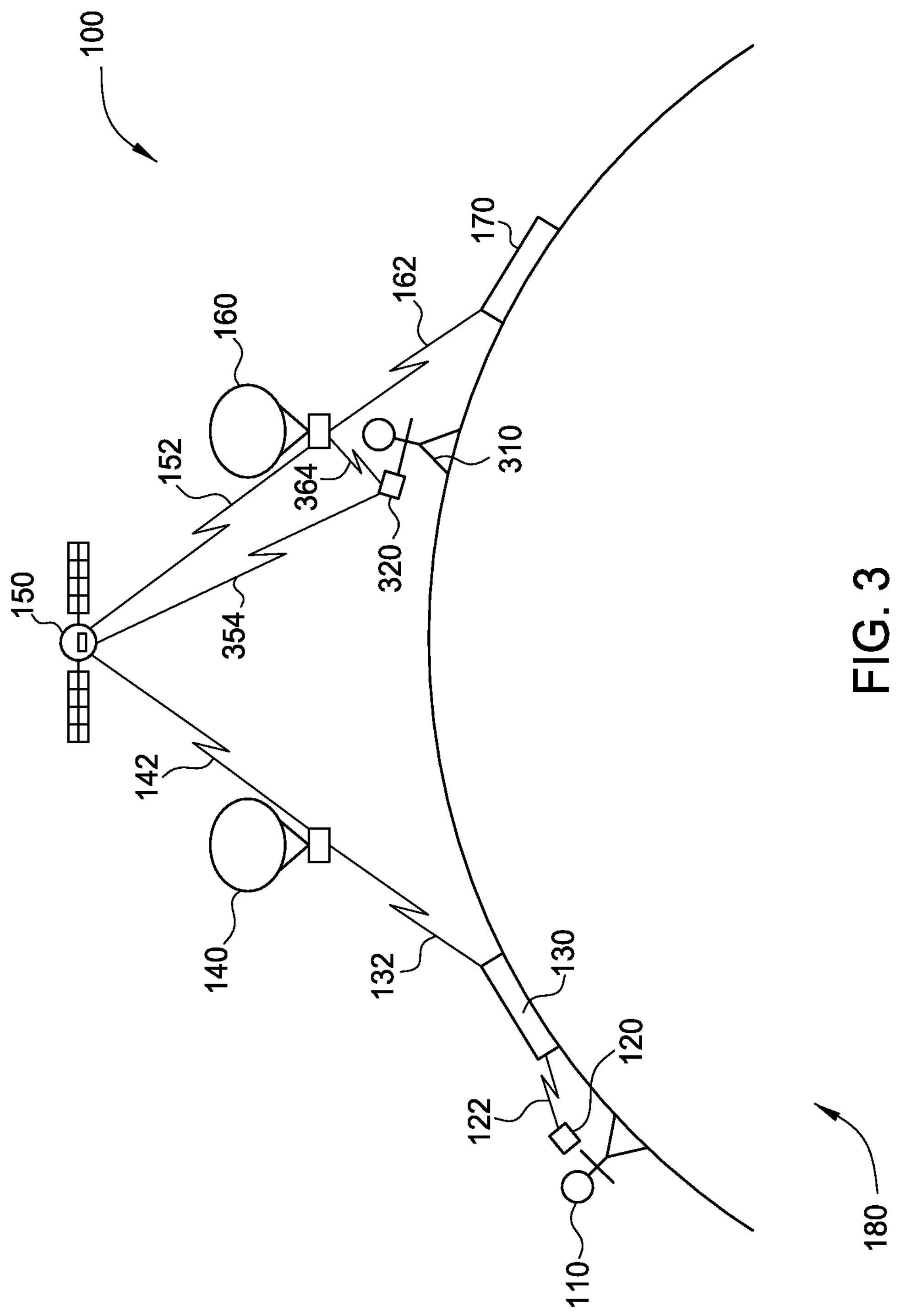
Figure 4:
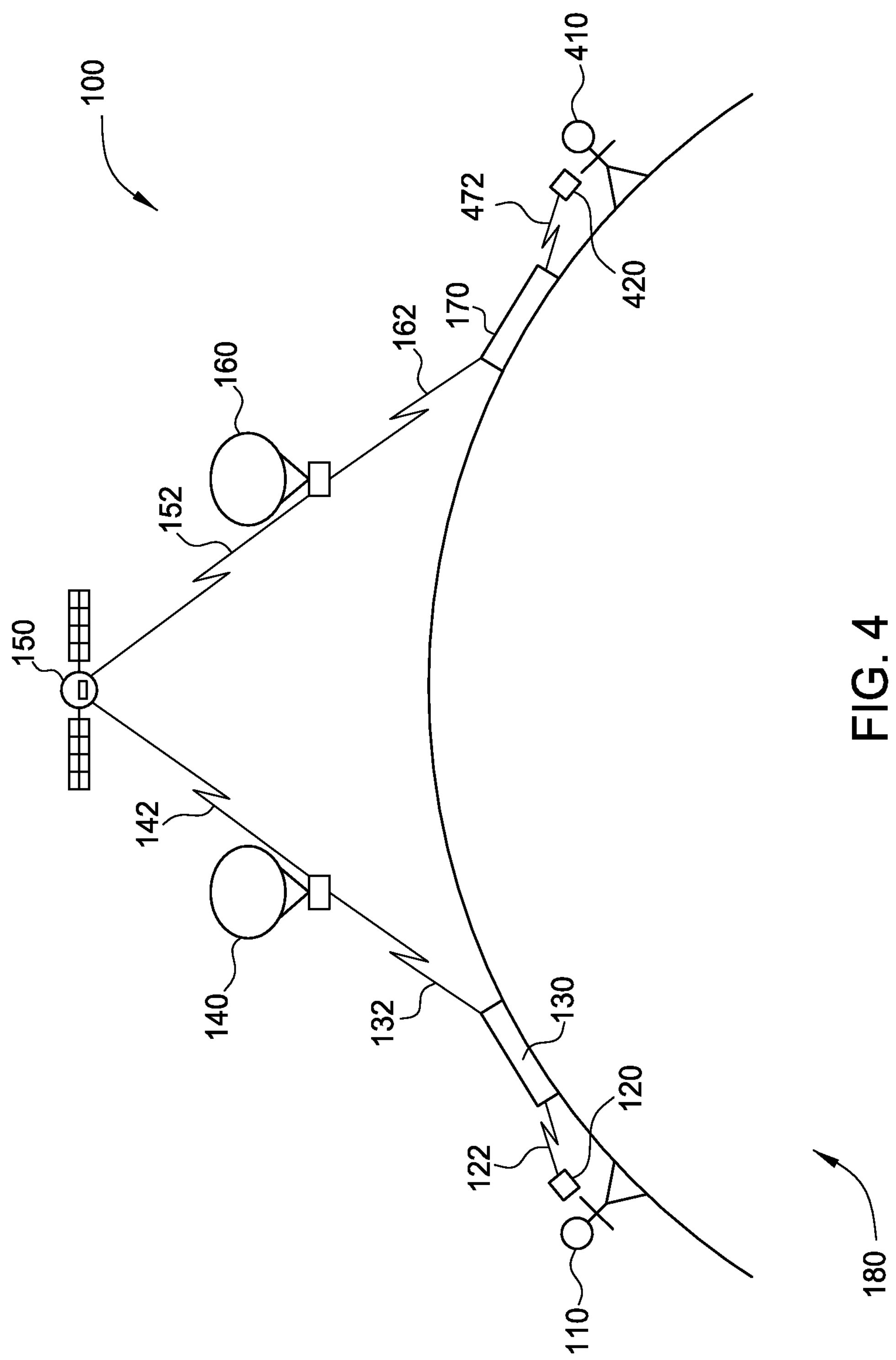

The amount of storage space within virtual cache 100 that is allocated to user 110, and the distribution of that storage space across the various storage centers 120, 130, 140, and 150, may change dynamically depending on the needs of user 110 and/or computing device 120. Specifically, when user 110 accesses data from a given remote location, the portion of virtual cache 100 allocated to user 110 may expand to include additional storage centers that reside at intermediate locations between user 110 and the remote location. Conversely, when user 110 no longer accesses data from a given remote location, the portion of virtual cache 100 allocated to user 110 may contract to no longer include those intermediate storage centers. FIGS. 2-4, described in greater detail below, discuss the elastic nature of virtual cache 100 in greater detail.

Exemplary Expansion of a Globally Distributed Virtual Cache

FIGS. 2-4 illustrate an exemplary expansion of the virtual cache of FIG. 1, according to one embodiment of the present invention. Persons skilled in the art will understand that the expansion scenario described below is provided for exemplary purposes only to illustrate that the portion of virtual cache 100 allocated to a particular user may increase in size based on user needs. Those skilled in the art will also recognize that the following techniques may equally be applied to a virtual cache portion that contracts in response to user needs.

In FIG. 2, user 110 uses computing device 120 to communicate with storage center 130 via data connection 134, as described above in conjunction with FIG. 1. Storage center 130 is configured to cache data that is associated with computing device 120, including data that is repeatedly accessed as well as streaming data that is received from a remote source, as also mentioned above. In addition, a user 210 uses computing device 220 to communicate with storage centers 130 and 140 via data connections 234 and 244, respectively. Similar to data connection 132, data connections 234 and 244 may be any technically feasible type of communication link, including any manner of wired or wireless communications.

Virtual cache 100 is configured to facilitate real-time or near real-time communication between users 110 and 210 via computing devices 120 and 220, respectively, and any intermediate storage centers disposed between those users. For example, users 110 and 210 could establish a video chat or teleconference with one another that involves the continuous exchange of audiovisual data. Computing device 120 would stream frames of video data showing user 110, synchronized with audio samples that reflect the speech of user 110, to computing device 210, and computing device 220 would stream analogous audiovisual data associated with user 210 back to computing device 110. To facilitate the exchange of this data, virtual cache 100 could buffer the audiovisual data exchanged between users 110 and 210 within storage center 130, thereby hiding latencies associated with the transfer of that data. With this approach, storage center 130 could deliver the buffered audiovisual data in real-time or near real-time, thus improving the user experience of that data.

Storage center 130 could also perform various operations with the buffered data prior to relaying that data onwards to the receiving user. For example, storage center 130 could perform synchronization operations to ensure that the frames of video data within the audiovisual data are synchronized correctly to the audio samples associated with that audiovisual data. Storage center 130 may also perform various filtration and other post-processing operations to improve the quality of that audiovisual data. Generally, storage center 130 operates as an intermediary between computing device 120 and 220 within which any technically feasible operations may occur while data exchanged between those devices is in transit.

Certain situations may arise that prevent computing devices 120 and 220 from communicating with one another via storage center 130. For example, user 210 could move away from storage center 130, thereby disrupting data connection 234 and preventing the exchange of data via storage center 130 alone. In such an exemplary situation, virtual cache 100 could transparently expand the virtual cache portions allocated to each of users 110 and 210 in order to continue to facilitate real-time or near real-time communication. Specifically, since storage centers 130 and 140 are coupled together, and computing device 220 is coupled to storage center 140, virtual cache 100 could automatically allocate storage resources within storage center 140 to support the ongoing communication between those computing devices. In doing so, storage center 130 could update storage center 140 with some or all of the buffered data associated with that communication, and storage centers 130 and 140 would then operate in conjunction with one another to support the continuous exchange of data between users 110 and 210. Storage center 140 would thus act as an intermediary between storage center 130 and computing device 220.

The approach described above may be repeated, on an as-needed basis, to expand the virtual cache portion associated with user 110 to facilitate communication with other users residing at more distant locations, as shown in FIG. 3.

In FIG. 3, a user 310 uses computing device 320 to communicate with storage centers 150 and 160 via data connections 354 and 364, respectively. Data connections 354 and 364 may be any technically feasible type of communication link, including any manner of wired or wireless communications. In situations where user 110 attempts to establish communications with user 310 via computing devices 120 and 320, respectively, virtual cache 100 provisions storage space in one or more of storage centers 130, 140, 150, and 160 to cache data exchanged between those computing devices. Similar to the example described above in conjunction with FIG. 3, that data could be audiovisual data associated with a teleconference between users 110 and 310, or any other technically feasible type of data.

Virtual cache 100 may selectively link computing devices 120 and 320 to one another via any of the storage centers shown in FIG. 3, and may adjust the specific pathway between those computing devices in order to facilitate real-time or near real-time communication between those devices. For example, virtual cache 100 could route data to and from storage center 150 directly via data connection 354, or indirectly by way of storage center 160 and data connection 364. Virtual cache 100 may expand even further to facilitate communication with even more distant users, as shown in FIG. 4.

In FIG. 4, virtual cache 100 provisions storage space in one or more of storage centers 130, 140, 150, 160, and 170 to cache data exchanged between user 110 and another user 410 via computing devices 120 and 420, respectively. As is shown, user 410 uses computing device 420 to connect to storage center 170 via data connection 472. Users 110 and 410 may engage in real-time or near real-time communications by virtue of the buffering techniques implemented by virtual cache 100. Specifically, some or all of storage centers 130, 140, 150 160, and 170 may buffer data, including audiovisual data, that is exchanged between computing devices 120 and 420. The aforementioned storage centers may also perform various processing operations on the exchanged data to improve the quality of that data and reduce potential flaws, errors, artifacts, and so forth that may be introduced in transit.

Referring generally to FIGS. 2-4, virtual cache 100 is configured to provision storage space dynamically based on the location of computing device 120 relative to other devices from which computing device 120 may access data. In doing so, virtual cache 100 may expand the virtual cache portion allocated to user 110, and, additionally, may contract that portion. For example, when user 110 no longer communicates with user 410, virtual cache 110 may determine that caching is no longer needed between computing devices 120 and 420, and so the virtual cache portion associated with user 110 may be contracted. In this fashion, the storage resources provided by the storage centers within virtual cache 100 may be efficiently allocated to users on an as-needed basis. In one embodiment, additional cost-parameter(s) could be associated with user 110 to determine if an account and/or plan associated with user 110 allows or disallows virtual cache expansion.

In addition, since virtual cache 100 provides access to a diverse set of different types of storage centers, capable of being deployed across various regions of Earth, virtual cache 100 is highly accessible. For example, atmosphere-based storage centers 140 and 160 can be moved to any region on Earth, and space-based storage center 150 can likewise be placed into any technically feasible orbit around Earth. Thus, these storage centers can be migrated in order to provide virtual cache access across the globe. In situations where users occupy a region that cannot, or is not wired to the Internet, the aforementioned varieties of storage centers may nonetheless provide connectivity to virtual cache 100 and, thus, to the Internet.

In an alternative embodiment, virtual cache expansion can occur between multiple storage centers of a single type, e.g., ground-based, space-based or atmosphere-based. Three stationary space-based storage centers may allow line-of-sight access to any region of the planet via atmosphere-based storage centers.

As mentioned above, each storage center includes one or more server machines configured to provide I/O access to various storage resources. An exemplary computing device configured to operate as a server machine within a storage center of virtual cache 100 is described in greater detail below in conjunction with FIG. 5.

Exemplary Computing Device for Caching User Data within the Virtual Cache

FIG. 5 illustrates a computing device configured implement one or more aspects of the present invention. Each storage center shown in FIGS. 1-4 may include one or more instances of computing device 500. As shown, computing device 500 includes a processing unit 510, input/output (I/O) device 520, and memory 530, coupled together. Memory 530 includes virtual cache engine 532 and cache storage 534.

Processing unit 510 may be any technically hardware unit configured to process data and execute program code, including a central processing unit (CPU), graphics processing unit (GPU), field-programmable gate array (FPGA), application-specific integrated circuit (ASIC), any combination of such units, and so forth. I/O devices 520 may include devices configured to receive input, such as a keyboard or mouse, etc., as well as devices configured to provide output, such as a display device or speaker array, etc. I/O devices 520 may also include devices configured to both receive and provide input and output, respectively, including a wireless transceiver, universal serial bus (USB) port, network connection, and so forth. Generally, I/O devices 520 include communication hardware configured to enable communication between instances of computing device 500 within a given storage center, as well as between instances of computing device 500 within different storage centers.

Memory 530 may include a hard disk, one or more random access memory (RAM) modules, high-speed solid-state devices (SSDs) or any combination thereof. Virtual cache engine 532 within memory 530 is a software application that, when executed by processing unit 510, configures computing device 500 as a whole to participate in virtual cache 100. In doing so, virtual cache engine 532 coordinates the caching and retrieval of data to and from, respectively, cache storage 534. Generally, cache storage 534 may be a portion of memory 530 or may be a separate hardware unit within memory 530 configured to cache data associated with virtual cache 100. Cache storage 534 may be separated into different portions, where each portion stores data associated with a different user.

Virtual cache engine 532 is configured to provision cache space within cache storage 534 for user 110 when the portion of virtual cache 100 associated with user 110 expands to include the storage center where computing device 500 resides. For example, when virtual cache 100 expands to include storage center 150, as described above in conjunction with FIGS. 2-3, an instance of computing device 500 that resides within storage center 150 could provision a portion of cache storage 534 to include storage space for user 110. Then, if user 110 repeatedly accesses the same remote data via storage center 150, virtual cache engine 532 could cache that data on behalf of user 110 within cache storage 534. In addition, cache storage 534 could be used to buffer data that is streaming from a remote location to user 110, as described by way of example in conjunction with FIGS. 2-4.

Techniques for Configuring a Virtual Cache to Cache User Data

Figure 6:
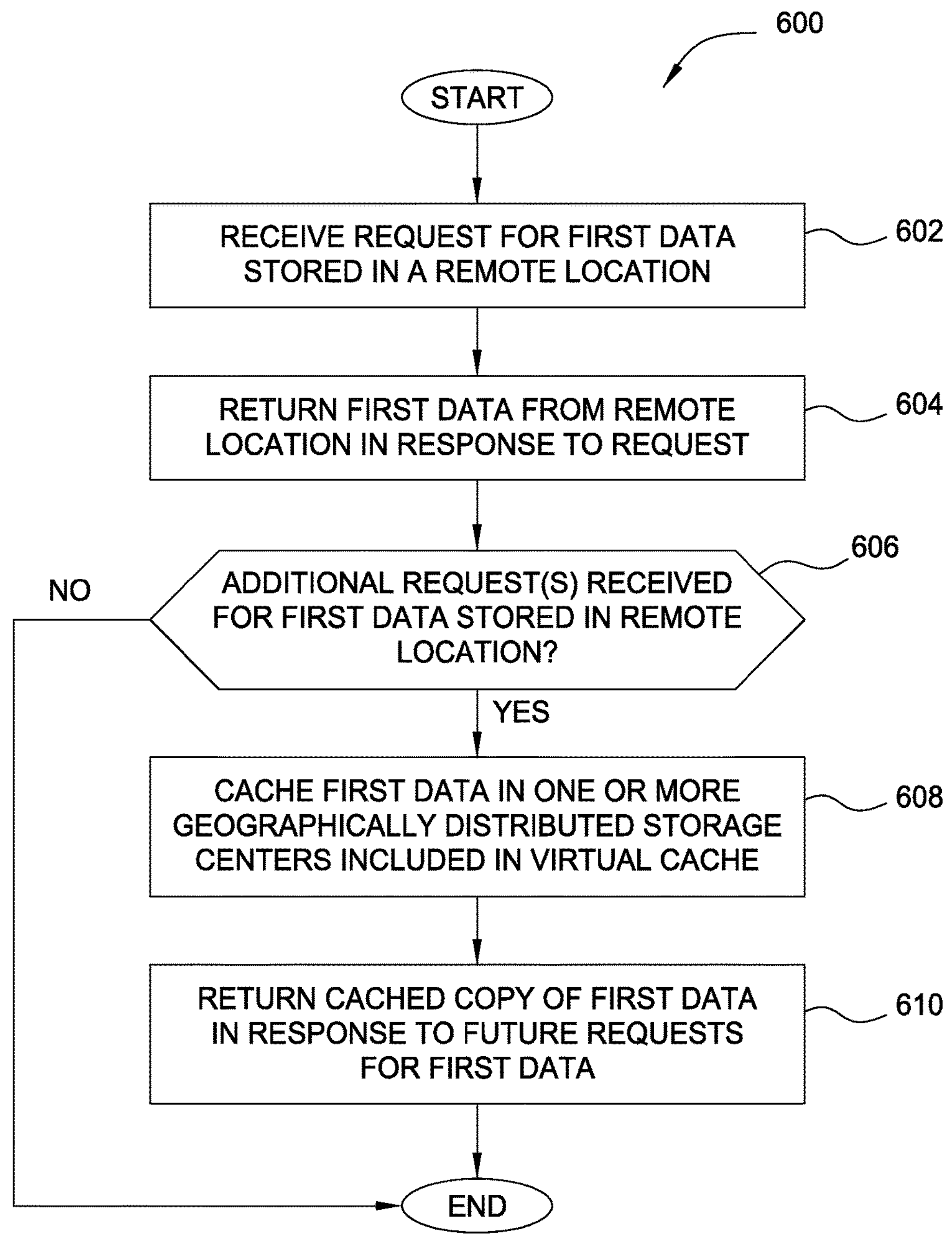
FIG. 6 is a flow diagram of method steps for accessing data stored in a virtual cache, according to one embodiment of the present invention.

FIG. 6 is a flow diagram of method steps for accessing data stored in a virtual cache, according to one embodiment of the present invention. Although the method steps are described in conjunction with the system of FIGS. 1-5, persons skilled in the art will understand that any system configured to perform the method steps, in any order, is within the scope of the present invention.

As shown, a method 600 begins at step 602, where virtual cache 100 receives a request from computing device 120 for first data that is stored in a remote location. The remote location could be, for example, computing devices 220, 320, or 420. At step 604, virtual cache 100 returns the first data to computing device 120 in response to the request.

At step 606, virtual cache 100 determines whether additional requests for the first data have been received from computing device 120. If no additional requests are received, then the method 600 ends. If additional requests for the first data are received, then the method 600 proceeds to step 608.

At step 608, virtual cache 100 caches the first data in one or more geographically distributed storage centers within virtual cache 100. The aforementioned storage centers could be any of storage centers 130, 140, 150, 160, or 170 shown in FIGS. 1-4. Each of the one or more storage centers includes one or more instances of computing device 500 shown in FIG. 5 that are configured to cache the first data within a corresponding instance of cache storage 534.

At step 610, virtual cache 100 returns the cached version of the first data to computing device 120 in response to future requests for the first data, thereby decreasing the request-to-response time for the first data. Generally, the various instances of computing device 500 that reside within the different storage centers each executes an instance of virtual cache engine 532 in order to collectively implement the method 600.

Figure 7:
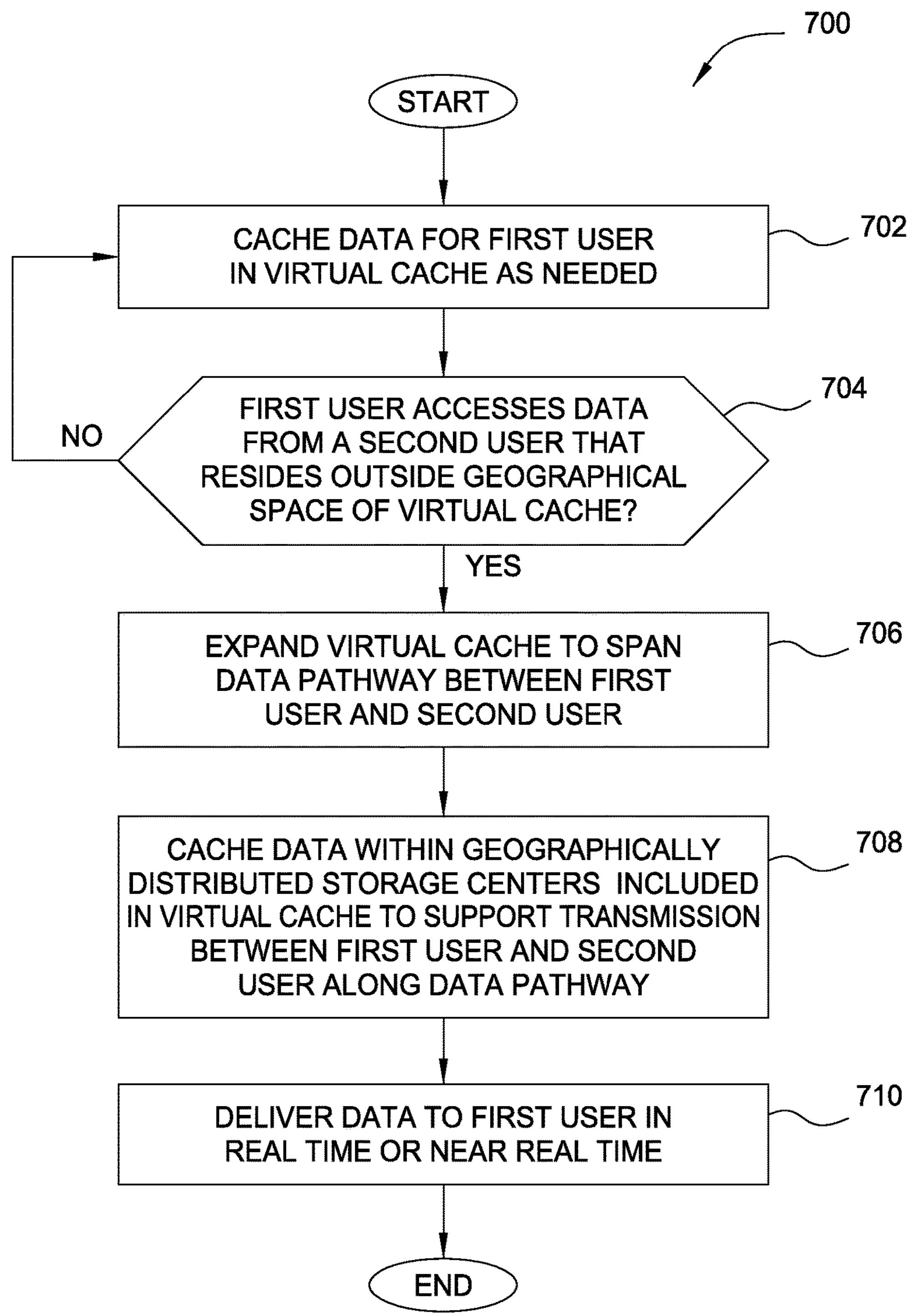
FIG. 7 is a flow diagram of method steps for expanding a virtual cache, according to one embodiment of the present invention.

FIG. 7 is a flow diagram of method steps for expanding a virtual cache, according to one embodiment of the present invention. Although the method steps are described in conjunction with the system of FIGS. 1-5, persons skilled in the art will understand that any system configured to perform the method steps, in any order, is within the scope of the present invention.

As shown, a method 700 begins at step 702, where virtual cache 100 caches data for user 110 within a portion of virtual cache 100 dedicated to user 100, as needed. Virtual cache 100 stores the data within one or more instances of computing device 500 of FIG. 5 that reside within one or more of the storage centers shown in FIGS. 1-4. Virtual cache 100 may implement the method 600 in performing step 702.

At step 704, virtual cache 100 determines whether user 110 accesses data from a computing device associated with a second user that resides outside of the geographical area covered by the portion of virtual cache. For example, user 110 could attempt to access data from user 420, as shown in FIG. 4, when the virtual cache portion provisioned for user 110 only extends as far as storage center 130, as shown in FIG. 2. Virtual cache 100 repeats step 704 until user 110 accesses data from the second user.

At step 706, virtual cache 100 expands the virtual cache portion provisioned for user 110 to span a data pathway between the first user and the second user. In the example mentioned above, virtual cache 100 could expand the virtual cache portion for user 110 to span storage centers 140, 150, 160, and 170. In doing so, virtual cache 100 may allocate storage space within instances of computing device 500 that reside within those storage centers.

At step 708, virtual cache 100 caches data that is exchanged between the first user and the second user within the cache space provisioned at step 706. At step 708, virtual cache delivers data to the first user from the second user in real-time or near real-time.

Persons skilled in the art will recognize that virtual cache 100 may implement the method 700 to cache data for computing devices configured to operate autonomously, independent of the actions of actual human users. For example, at step 702, virtual cache 100 may cache data for an autonomous computing device that is not under direct control of a human user. The autonomous computing device could be a proxy server configured to autonomously access data from remote locations for client computing devices, among other possibilities. In another example, at step 706, a first autonomous computing device could access data from a second autonomous computing device that resides in a remote location, and virtual cache 100 could then expand the virtual cache portion dedicated to the first autonomous computing device to cover that remote location. Generally, virtual cache 100 may perform the method 700 on behalf of human users and computing devices associated with those users, or autonomous computing devices that operate without direct human oversight.

In sum, a globally distributed virtual cache is configured to provide high-speed storage resources tuned for real-time or near real-time data access, for users around the globe. A user of the virtual cache uses a computing device to access data that is stored in storage centers included within the virtual cache. Those storage centers may be surface-based, atmosphere-based, or space-based. When the user accesses the same data repeatedly, the virtual cache migrates that data to a storage center that is closer to the user, thereby reducing latencies associated with accessing that data. When the user attempts to communicate with another user also coupled to the virtual cache, the virtual buffers data that is exchanged between those users to facilitate real-time or near real-time communication between those users.

One advantage of the techniques described above is that users of the virtual cache may access data from one another in real-time or near real-time, without the disruptive effects of stalled data streams, decreased frame rates, low resolution video, and so forth. In addition, since the virtual cache is globally distributed across a diverse collection of different types of storage centers, users may access data from within those storage centers from potentially anywhere on Earth. Achieving real-time data can also be implemented by accessing data that is mirrored across alternate pathways, if real-time or near real-time access is otherwise difficult to achieve.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., video processing and/or speech analysis applications) or related data available in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for caching data within a globally distributed virtual cache, the method comprising:

provisioning, to a first server implementing a first portion of the globally distributed virtual cache, a first storage resource associated with a first geographic region to cache first data associated with a first computing device, wherein the first computing device is associated with a first user and is coupled to the first server;

determining that second data is streaming to the first computing device from a second computing device that is associated with a second user and is coupled to a second server implementing a second portion of the globally distributed virtual cache associated with a second geographic region located farther away from the first computing device than the first geographic region; and in response:

automatically provisioning additional cache storage space to at least one of the first server and a third server implementing a third portion of the globally distributed virtual cache associated with a region located between the first geographic region and the second geographic region, and causing one or more processors included in at least one of the first server and the third server to execute one or more applications that cause the additional cache storage space to buffer the second data while the second data is being streamed from the second computing device to the first computing device.

2. The computer-implemented method of claim 1, further comprising causing the first storage resource and the additional cache storage space to buffer third data streamed from the second computing device to the first computing device.

3. The computer-implemented method of claim 2, wherein the first storage resource and the additional cache storage space buffer the third data to hide latency associated with streaming the third data from the second computing device to the first computing device.

4. The computer-implemented method of claim 2, wherein the first computing device resides in the first geographic region, and the second computing device resides in the second geographic region.

5. The computer implemented method of claim 1, further comprising causing the first storage resource to cache third data accessed repeatedly by the first computing device.

6. The computer-implemented method of claim 1, wherein the first storage resource or the additional cache storage space comprises a surface-based storage center disposed on the surface of the Earth and includes at least one server machine to cache at least one of the first data and the second data.

7. The computer-implemented method of claim 1, wherein the first storage resource or the additional cache storage space comprises an atmosphere-based storage center disposed above the surface of the Earth and within the atmosphere of the Earth and includes at least one server machine to cache at least one of the first data and the second data.

8. The computer-implemented method of claim 1, wherein the first storage resource or the additional cache storage space comprises a space-based storage center disposed within the orbit around the Earth and includes at least one server machine to cache at least one of the first data and the second data.

9. The computer-implemented method of claim 1, further comprising:
- determining that the first computing device is no longer streaming the second data; and
- reconfiguring the at least one of the first server and the third server to no longer include the additional cache storage space.

10. A system to cache data, comprising:
- a first server machine, including:
  - a memory including a virtual cache engine,
  - a processor coupled to the memory, wherein, when the processor executes the virtual cache engine, the processor:
    - provisions, to a first server implementing a first portion of the globally distributed virtual cache, a first storage resource associated with a first geographic region to cache first data associated with a first computing device, wherein the first computing device is associated with a first user and is coupled to the first server,
    - determines that second data is streaming to the first computing device from a second computing device that is associated with a second user and is coupled to a second server implementing a second portion of the globally distributed virtual cache associated with a second geographic region located farther away from the first computing device than the first geographic region, and
    - in response:
      - automatically provisions additional cache storage space to at least one of the first server and a third server implementing a third portion of the globally distributed virtual cache associated with a region located between the first geographic region and the second geographic region, and
      - cause one or more processors included in at least one of the first server and the third server to execute one or more applications that cause the additional cache storage space to buffer the second data while the second data is being streamed from the second computing device to the first computing device.

11. The system of claim 10, wherein the processor further causes the first storage resource and the additional cache storage space to buffer third data streamed from the second computing device to the first computing device.

12. The system of claim 11, wherein the first storage resource and the additional cache storage space buffer the third data to hide latency associated with streaming the third data from the second computing device to the first computing device.

13. The system of claim 11, wherein the first computing device resides in the first geographic region, and the second computing device resides in the second geographic region.

14. The system of claim 10, wherein the processor further causes the first storage resource to cache third data accessed repeatedly by the first computing device.

15. The system of claim 10, wherein the first storage resource or the additional cache storage space comprises a surface-based storage center disposed on the surface of the Earth and includes at least one server machine to cache at least one of the first data and the second data.

16. The system of claim 10, wherein the first storage resource or the additional cache storage space comprises an atmosphere-based storage center disposed above the surface of the Earth and within the atmosphere of the Earth and includes at least one server machine to cache at least one of the first data and the second data.

17. The system of claim 10, wherein the first storage resource or the additional cache storage space comprises a space-based storage center disposed within the orbit around the Earth and includes at least one server machine to cache at least one of the first data and the second data.

18. The system of claim 10, wherein the processor further:
- determines that the first computing device is no longer streaming the second data; and
- reconfigures the at least one of the first server and the third server to no longer include the additional cache storage space.

19. A non-transitory computer-readable medium storing program instructions that, when executed by a processor, cause the processor to cache data within a globally distributed virtual cache, by performing the steps of:
- provisioning, to a first server implementing a first portion of the globally distributed virtual cache, a first storage resource associated with a first geographic region to cache first data associated with a first computing device, wherein the first computing device is associated with a first user and is coupled to the first server;
- determining that second data is streaming to the first computing device from a second computing device that is associated with a second user and is coupled to a second server implementing a second portion of the globally distributed virtual cache associated with a second geographic region located farther away from the first computing device than the first geographic region; and
- in response:
  - automatically provisioning additional cache storage space to at least one of the first server and a third server implementing a third portion of the globally distributed virtual cache associated with a region located between the first geographic region and the second geographic region, and
  - causing one or more processors included in at least one of the first server and the third server to execute one or more applications that cause the additional cache storage space to buffer the second data while the second data is being streamed from the second computing device to the first computing device.

20. The non-transitory computer-readable medium of claim 19, further comprising the step of causing the first storage resource and the additional cache storage space to buffer third data streamed from the second computing device to the first computing device, wherein the first computing device resides in the first geographic region, and the second computing device resides in the second geographic region.

21. The non-transitory computer-readable medium of claim 19, further comprising the steps of:
- determining that the first computing device is no longer streaming the second data; and
- reconfiguring the at least one of the first server and the third server to no longer include the additional cache storage space.

22. The non-transitory computer-readable medium of claim 19, wherein:
- the first portion of the globally distributed virtual cache resides in the first geographic region, the second portion of the globally distributed virtual cache resides in the second geographic region, and the first computing device streaming the second data while buffering the second data in the additional cache storage space hides a latency associated with the streaming of the second data.

* * * * *